United States Patent
Kobayashi

(10) Patent No.: US 9,520,788 B2
(45) Date of Patent: Dec. 13, 2016

(54) APPARATUS AND METHOD FOR CURRENT SHARING IN A MULTI-PHASE SWITCHING REGULATOR

(71) Applicant: Dialog Semiconductor GmbH, Kirchheim/Teck-Nabern (DE)

(72) Inventor: Hidenori Kobayashi, Kawasaki (JP)

(73) Assignee: Dialog Semiconductor (UK) Limited, Reading (GB)

( * ) Notice: Subject to any disclaimer, the term of this patent is extended or adjusted under 35 U.S.C. 154(b) by 0 days.

(21) Appl. No.: 14/468,579

(22) Filed: Aug. 26, 2014

(65) Prior Publication Data
US 2016/0049874 A1 Feb. 18, 2016

(51) Int. Cl.
G05F 1/455 (2006.01)
H02M 3/158 (2006.01)
H02M 3/157 (2006.01)
H02M 1/00 (2006.01)

(52) U.S. Cl.
CPC .......... H02M 3/1584 (2013.01); H02M 3/157 (2013.01); *H02M 3/1588* (2013.01); *H02M 2001/0009* (2013.01); *H02M 2001/0025* (2013.01); *H02M 2003/1586* (2013.01); *Y02B 70/1466* (2013.01)

(58) Field of Classification Search
CPC .................................................. H02M 3/135
USPC ................ 323/241, 266, 271, 272, 282–285, 322,323/351; 363/65
See application file for complete search history.

(56) References Cited

U.S. PATENT DOCUMENTS

| | | | | |
|---|---|---|---|---|
| 6,465,993 | B1 * | 10/2002 | Clarkin | H02M 3/156 323/272 |
| 6,495,995 | B2 * | 12/2002 | Groom | H02M 3/1584 323/283 |
| 7,508,182 | B1 | 3/2009 | Chang | |
| 8,120,346 | B2 * | 2/2012 | Ostrom | H02M 3/156 323/272 |
| 8,330,438 | B2 | 12/2012 | Sreenivas | |
| 8,330,439 | B2 | 12/2012 | Wu | |
| 8,405,368 | B2 | 3/2013 | Laur et al. | |

(Continued)

OTHER PUBLICATIONS

European Search Report, 14181098.6-1809, Feb. 2, 2015, Dialog Semiconductor GmbH.

*Primary Examiner* — Adolf Berhane
*Assistant Examiner* — Nusrat Quddus
(74) *Attorney, Agent, or Firm* — Saile Ackerman LLC; Stephen B. Ackerman

(57) ABSTRACT

An apparatus and method for a multi-phase switch regulator with improved efficiency is disclosed. The device has parallel implementations for the different phases comprising a driver, a current sense variable gain amplifier, a current share circuit, a pulse width modulation (PWM) control circuit, a trim network, and an inductor. A method is disclosed of providing a system with current sharing function comprising a driver circuit, a current sense circuit, a current share circuit, a PWM control circuit and a trim circuit, providing a current sense circuit for each segment of a driver circuit, sensing a signal using a current sense circuit for each segment of a driver circuit, comparing the output of the current sense circuit, providing the current error information to a PWM controller, generating a PWM drive signal of each phase, and finally, equalizing the output of the current sense amplifier. Other methods that utilize dummy output stages and low pass filter feedback is disclosed.

10 Claims, 6 Drawing Sheets

(56) References Cited

U.S. PATENT DOCUMENTS

| | | | |
|---|---|---|---|
| 8,487,477 B2 | 7/2013 | Heineman | |
| 8,502,515 B1 | 8/2013 | Wan et al. | |
| 8,907,910 B2 * | 12/2014 | Stearns | G06F 3/038 |
| | | | 345/173 |
| 8,917,077 B2 * | 12/2014 | Lin | G05F 1/10 |
| | | | 323/271 |
| 9,018,929 B2 * | 4/2015 | Isham | H02M 3/158 |
| | | | 323/283 |
| 2004/0085789 A1 | 5/2004 | Lipcsei | |
| 2005/0225307 A1 | 10/2005 | Sato et al. | |
| 2013/0249518 A1 * | 9/2013 | Giannopoulos | H02M 3/156 |
| | | | 323/284 |
| 2014/0021929 A1 * | 1/2014 | Lin | G05F 1/10 |
| | | | 323/271 |
| 2014/0191736 A1 * | 7/2014 | Babazadeh | H02M 3/1582 |
| | | | 323/271 |
| 2014/0266120 A1 * | 9/2014 | Isham | H02M 3/158 |
| | | | 323/283 |

\* cited by examiner

APPARATUS AND METHOD FOR CURRENT SHARING IN A MULTI-PHASE SWITCHING REGULATOR

BACKGROUND

Field

The disclosure relates generally to a multi-phase switching regulator circuits and, more particularly, to a multi-phase switching regulator device having improved current sharing function thereof.

Description of the Related Art

Multi-phase switching regulators, sometimes known as a multi-phase switcher, is designed to distribute the output current evenly for each phase. In steady state operation, each phase has an equal amount of current. Some of the multi-phase switcher devices have the current sharing circuit which equalizes the current in each phase using a feedback mechanism. With equal current in each phase, the highest conversion efficiency is achieved when all phases are identical and symmetric; this is achieved with the same output stage switch, and the same inductor element.

In systems today, some of the multi-phase switch regulators have a "phase shedding" function. The phase shedding function reduces the number of active phases when the external load is light. For example, for the light load case, typically only one phase is operating, and all other phases will stop switching. In the multi-phase switch regulators, with phase shedding function, using the same inductor element for all the phases may be an optimum solution. For example, the efficiency can be improved using a low alternating current (AC) loss inductor during light load applications. During light load conditions, in phase 1 operation, the alternating current (AC) loss is dominated by inductor core loss. In contrast, usage of a low direct current (DC) loss inductor for the other phases improves the efficiency at heavy load conditions. For heavy load conditions, the conduction loss (e.g. IR loss) is dominant in the heavy load conditions.

Inductors are non-ideal and contain inductive, resistive and capacitive electrical characteristics. Different type of inductors typically have different DC and AC resistance. Current equalization in each phase of a multi-phase switch regulator is not optimum.

To illustrate the influence of resistance of inductor elements on multi-phase switch regulators, an example of a two-phase multi-phase switcher is shown. FIG. 1 illustrates two phases, Phase 1 5 and Phase 2 7, with an equivalent model of two inductors in parallel. The first phase current, Phase 1 5, is defined as I1 15. The second phase current, Phase 2 7, is defined as I2 25. The equivalent model for the first inductor is shown as resistor element R1 10, and inductor L1 20. The equivalent model for the second inductor is shown as resistor element R2 30, and inductor L2 40. The resistor R1 10, and resistor R2 30 include the inductor DC resistance and output switch resistance of switching regulators. The first and second current, I1 15 and I2 25, respectively sum to establish the output current I OUT, which flows into capacitor load C out 50 and Rload. The optimum current I1 15 and I2 25 to minimize the loss can be expressed as follows:

$$I1 = R2/(R1+R2) \times Iout$$

$$I2 = R1/(R1+R2) \times Iout$$

If the resistance R1 and resistance R2 are of equal magnitude, then the current is split equally between the two phases, will minimize DC resistive loss. If the resistance R1 and resistance R2 are non-identical (and not equal), DC resistance loss, the same I1 and I2 current will not minimize.

Concepts for detection and current balancing has been discussed in DC-DC converter circuits. U.S. Pat. No. 8,502,515 to Wan et al, describes a DC-DC converter having a load, a current detecting circuit and a channel current balance circuit.

Implementations to discuss proper ramping of current sharing also has been disclosed. U.S. Pat. No. 8,487,477 to Heineman shows a plurality of phases, a power stage, a feedback to balance the currents in the inductors. This circuit comprises a PID filter, a PWM, output control, power switches, load capacitor, and inductor and a feedback error amplifier to the PID filter.

Phase sharing has also been discussed in switching regulators. U.S. Pat. No. 8,405,368 to Laur et al. has a multiple phases, multiple loads, and a phase current sharing solution. The phase current sharing network includes conversion networks, and phase current combining networks.

Current balancing has also been discussed in multi-phase buck converters. U.S. Pat. No. 8,330,439 to Wu et al. shows a system and a methodology for current balancing in a multi-phase buck converter. The system includes power stages, inductors error amplifiers, PFM/PWM transition logic and power stage control logic.

Other concepts have also been proposed in multiple switch converters. U.S. Pat. No. 8,330,438 to Sreenivas et al. describes a means of a system and a methodology for current balancing in a multi-phase buck converter. The circuit comprises output voltage controller, and plurality of inductors, low pass filters, and phase balance networks.

It is desirable to provide a solution to address the disadvantages of current balancing and efficiency in a multi-phase switching regulator.

SUMMARY

A principal object of the present disclosure is to provide a circuit that can intentionally be used for imbalanced phase current.

A principal object of the present disclosure is to provide a circuit that can intentionally change phase current to optimize efficiency in a multi-phase regulator with different inductors.

The above and other objects are achieved by a multi-phase regulator with different inductors.

In addition, a device is disclosed in accordance with the embodiment of the disclosure. A multi-phase switch regulator with improved efficiency, the device comprising a pulse width modulation (PWM) control circuit which is configured to generate a PWM signal for each phase, a driver control network electrically coupled to said pulse width modulation (PWM) control circuit configured to receive a PWM signal (from said pulse width modulation (PWM) control circuit), an output stage electrically coupled to said driver configured to provide an output, a current sense circuit electrically coupled to said output stage configured to provide a phase current sense information, a current share circuit configured to receive the current signal from said current sense circuit and to provide a current share offset to said pulse width modulation (PWM) controller circuit for current balancing, and, a trim circuit electrically connected to said current sense circuit.

In addition, a device is disclosed in accordance with the embodiment of the disclosure. The device is a multi-phase switch regulator with improved efficiency, the device comprising a pulse width modulation (PWM) control circuit configured to generate PWM signal for each phase, a driver control network electrically coupled to said pulse width modulation (PWM) control circuit configured to receive a PWM signal (signal from said pulse width modulation (PWM) control circuit), an output stage electrically coupled to said driver configured to provide an output, a dummy output stage configured to receive driver signals from said driver control network, a low pass filter (LPF) electrically coupled to the output of a dummy driver output stage, a current share circuit configured to receive a low pass filter (LPF) signal from said low pass filter (LPF) and providing an low pass filter (LPF) output signal to said pulse width modulation (PWM) control circuit for current balancing.

In addition, a method is disclosed in accordance with the embodiment of the disclosure. A method of current sharing in a multi-phase switch regulator comprising the steps of (1) providing a system with current sharing function comprising a driver circuit, a current sense circuit, a current share circuit, a PWM control circuit, and a trim circuit, (2) providing said current sense circuit for each phase of said driver circuit, (3) sensing a signal using said current sense circuit for each phase of said driver circuit, (4) comparing the output of said current sense circuits, (5) generating a PWM drive signal, and, (6) equalizing the output of the current sense amplifier.

In addition, a method is disclosed in accordance with the embodiment of the disclosure. A method of current sharing in a multi-phase switch regulator comprising the steps of (1) providing an adaptive current sharing optimization system comprising a driver circuit, an output stage, a dummy output stage, a low pass filter, a current share circuit, and a PWM control circuit, (2) driving a signal to said dummy output stage, (3) filtering a signal of said dummy output stage, (4) providing signals to said current share circuit, (5) providing the current error information to said PWM control circuit, and, (6) generating a PWM drive signal of each phase.

As such, a novel multi-phase switching regulator with improved efficiency is disclosed. Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DETAILED DESCRIPTION

Figure 1:
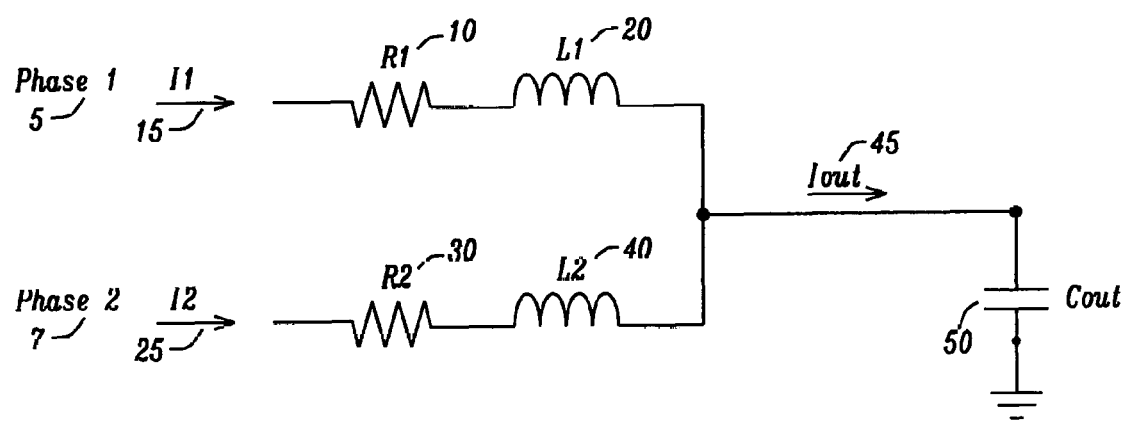
FIG. 1 is a circuit schematic of a two phase switching regulator inductor equivalent model.

To illustrate the influence of resistance of inductor elements on multi-phase switch regulators, an example of a two-phase multi-phase switcher is shown. FIG. 1 shows the resistance and inductance of the two inductor two phase multi-phase switcher elements in accordance with prior art embodiment. The first phase current, from Phase 1, 5 is I1 15. The second phase current, from Phase 2 7, is I2 25. The equivalent model for the first inductor is shown as resistor element R1 10, and inductor L1 20. The equivalent model for the second inductor is shown as resistor element R2 30, and inductor L2 40. The resistor R1 10, and resistor R2 30 includes the inductor DC resistance and output switch resistance of switching regulators. The first and second current, I1 15 and I2 25, respectively sum to establish the output current I OUT 45, which flows into capacitor load C out 50 and Rload. The optimum current I1 15 and I2 25 to minimize the loss can be expressed as follows:

$$I1 = R2/(R1+R2) \times Iout$$

$$I2 = R1/(R1+R2) \times Iout$$

If the resistance R1 10 and resistance R2 30 are of equal magnitude, then the current is split equally between the two phases will minimize DC resistive loss. If the resistance R1 and resistance R2 are non-identical (and not equal), the same I1 and I2 current will minimize.

Figure 2:
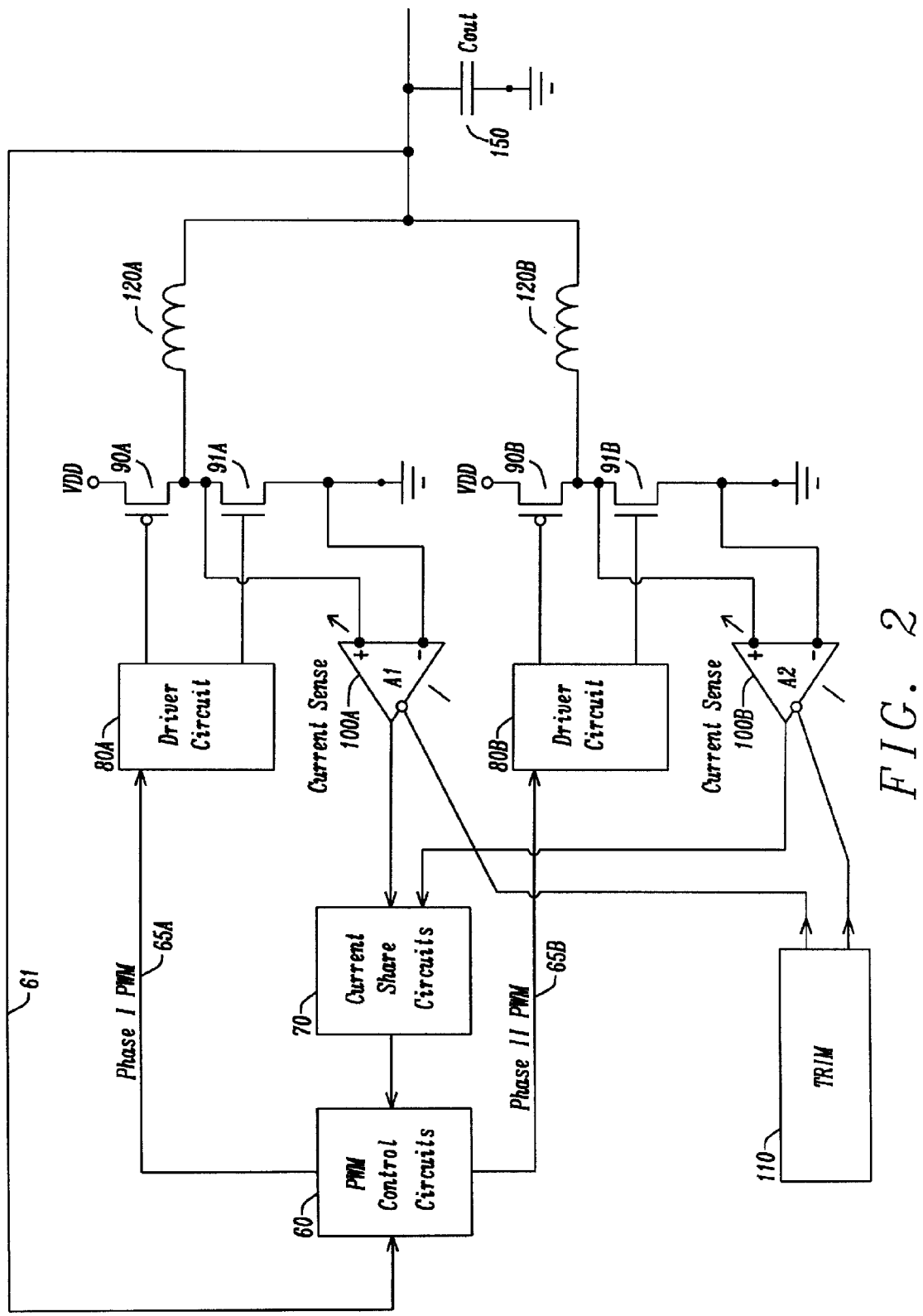
FIG. 2 is a circuit schematic of a first embodiment with current sense circuitry and trim function circuitry.

FIG. 2 is a circuit schematic of a first embodiment with current sense circuitry and trim function circuitry. In this embodiment, a function is implemented which can arbitrarily set the current sharing ratio of each phase where current sharing can be achieved with different inductors, or different switch sizes on the output stage.

The inductor elements are external components. The inductors are not a fixed size element, but can vary by application. As a result, the adjustments to the application can be done after device personalization and customization. This can be done by trimming with laser/non-volatile memory or a digital interface. The embodiment in FIG. 2 can have the following features of (1) sensing the current in each phase, (2) current sense gain modified by the user by trimming or digital interface, and (3) a current feedback circuit which controls current sharing by adding an offset for each PWM signal in each phase (e.g. to keep/control each current snese output same. In this embodiment, a multi-phase switch regulator is discussed. A multi-phase switch regulator with improved efficiency, the device comprising a pulse width modulation (PWM) control circuit which is configured to generate a PWM signal for each phase, a driver control network electrically coupled to said pulse width modulation (PWM) control circuit configured to receive a PWM signal (from said pulse width modulation (PWM) control circuit), an output stage electrically coupled to said driver configured to provide an output, a current sense circuit electrically coupled to said output stage configured to provide a phase current sense information, a current share circuit configured to receive the current sense circuit output signal from said current sense circuit and to provide a current share offset to said pulse width modulation (PWM) controller circuit for current balancing, and, a trim circuit electrically connected to said current sense circuit.

FIG. 2 shows the circuit schematic of the first embodiment of a two-phase buck converter. Note that this can be applicable to any number of phases, and other converter topologies such as boost, and buck-boost converter. In this example of a two-phase buck converter, the circuit comprises a pulse width modulation (PWM) controller circuit 60 which generates the Phase 1 PWM signal 65A and Phase 2 PWM signal 65B. A feedback signal 61 from the output is an input to the PWM control circuit 60. The PWM control circuit 60 receives a signal from the current share circuit 70.

The Phase 1 PWM signal 65A is coupled to the driver network 80A. The Phase 2 PWM signal 65B is coupled to the driver network 80B. The driver network 80A provides signals to the driver output stage, for p-channel MOSFET pull-up 90A, and n-channel MOSFET pull-down 91A. The driver network 80B provides signals to the driver output stage, for p-channel MOSFET pull-up 90B, and n-channel MOSFET pull-down 91B. Current sense circuit for the Phase 1 network is a variable amplifier 100A coupled to the n-channel MOSFET pull-down 91A. Current sense circuit for the Phase 2 network is a variable amplifier 100B coupled to the n-channel MOSFET pull-down 91B. The output signal of current sense amplifier 100A is coupled to the current share circuit 70. The output signal of current sense amplifier 100B is coupled to the current share circuit 70. The current sense amplifier 100A and current sense amplifier 100B are electrically coupled to the trim circuit 110. At the driver stage output of the Phase 1 network is an inductor 120A. At the driver stage output, of the Phase 2 network is an inductor 120B. Both inductors 120A and 120B are electrically connected to the output, and output capacitor Cout 150.

The current sense circuit amplifies the sensed current or sensed voltage. In this embodiment, the current sense amplifier is a variable gain amplifier which for the gain can be changed independent of each phase. Current sharing circuitry compares the output of current sense circuits and provides the current error information to the PWM controller. The PWM controller generates appropriate PWM drive signal for each phase, making the current sense amplifier (e.g. variable gain amplifier) output of the same value. If the gain of the variable gain amplifier A1 (Phase 1) 100A and variable gain amplifier A2 (Phase 2) 100B are the same magnitude, then the current share circuit (e.g. the feedback) will keep the phase current the same. If the gain values of the two amplifiers are different, the current share circuit will achieve a different current ratio current share function.

In the embodiment illustrated in FIG. 2, the current sensing is done by the low-side switch voltage drop (.e.g. the n-channel MOSFET pull-down device). Note that this can be done with a high-side switch voltage drop (e.g. the p-channel MOSFET pull-up device), or a external current sense resistor between the inductor element and the output capacitor, or other current sense methodologies. Additionally, the current sense network can add variable gain amplifiers on each output of the current sense circuit. The variable gain amplifier control is established by the user using either trimming, or by a digital interface.

Figure 3:
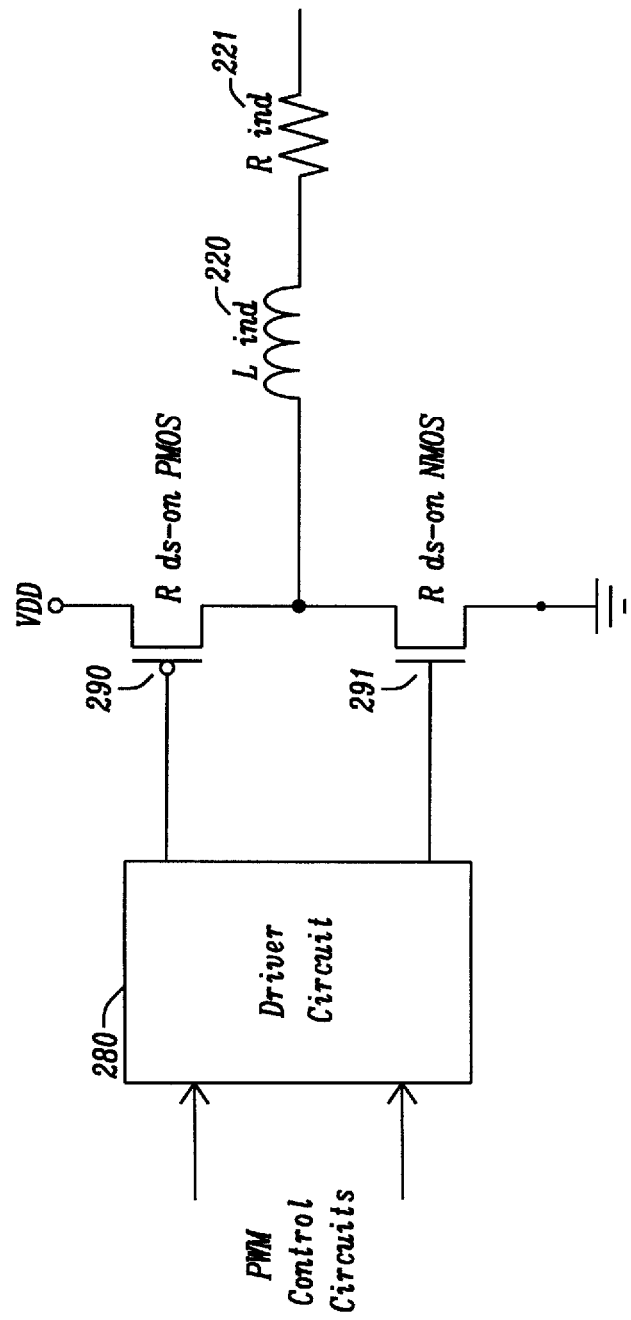
FIG. 3 is a circuit schematic of a driver output stage and inductor equivalent model.

FIG. 3 is a circuit schematic of a driver output stage and inductor equivalent model. FIG. 3 shows the output stage of the driver network, the input signals to the gates of the driver stage, and inductive/resistive load. The equivalent model for the inductor is shown as an inductor 220, and a resistor 221. The output driver controls to the MOSFET gates consist of control network 280, comprising a PWM signal and the duty factor (D) signal. The output stage of the driver has a pull-up p-channel MOSFET 290, and a pull-down n-channel MOSFET 291. Current sharing circuitry compares the output of current sense circuits and provides the current error information to PWM controller. The PWM controller generates an appropriate PWM drive signal for each phase, making the current sense amplifier (e.g. variable gain amplifier) output of the same value. If the gain of the variable gain amplifiers are the same magnitude, then the current share circuit (e.g. the feedback) will keep the phase current the same. If the gain values of the two amplifiers are different, the current share circuit will achieve a different current ratio current share function. The ratio is set by trimming, or established by a digital/analog interface according to the DC resistance difference between the phases. Given the device has a function to estimate the DC resistance, then the current sharing ratio can change adaptively according to the DC resistance. The MOSFET drain-to-source on-resistance of the p-channel pull-up MOSFET 290 can be expressed as Rds-on p. The MOSFET drain-to-source on resistance of the n-channel pull-up MOSFET 291 can be expressed as Rds-on n. The resistance for each phase can be calculated from the duty cycle (D), the inductor resistance, and the MOSFET drain-to-source on resistances, as follows:

$$R1=(D)\times Rds\text{-on } p+(1-D)\times Rds\text{-on } n+Rind$$

In some applications, using different size or type of output stage devices (switching devices) may provide improved overall efficiency. In this case, the DC resistance of each phase will have a larger difference, and with optimization, can lead to improved efficiency.

As an example of the disclosed technique, An optimum current balance to minimize DC current can be calculated as follows:
If high side and low side switch Rds-on=40 mohm, and phase1 uses the inductor with 60 mohm DC resistance, and phase 2~4 use the inductor with 20 mohm inductors.

$$Rdc1=100\text{mohm},$$

$$Rdc2\text{~}4=60\text{mohm}$$

Thus, optimum current sharing condition to minimize DC resistance $$5/3*I1=I2=I3=I4$$

$$(I1=60\% \text{ of } I2, I3 \text{ and } I4)$$

Therefore, the gain of current sense amplifier in phase 1 should be 5/3 times higher than other phase current sense amplifier gain. The total DC loss with current invention will be:
Total 10A case,
If the current share trimming is set properly, each phase current will be:

$$I1=1.667 \text{ A}, I2=I3=I4=2.778 \text{ A},$$

and the total DC loss=1667 mW (according to this embodiment) I
If current is shared evenly, then $$I1=I2=I3=I4=2.5 \text{ A and the total DC loss}=1750 \text{ mW(without this embodiment)}$$

The power loss can be reduced by 83 mW with the embodiment in the disclosure. The conduction loss can be reduced 5% in this case, if current share circuit set phase 1 current as 60% of other phase current. In some applications, using different size or type of output stage devices (switching devices) may provide a better overall efficiency. In this case, the DC resistance of each phase will have larger difference, and if it is optimized, the current can effectively improve the efficiency.

Figure 4:
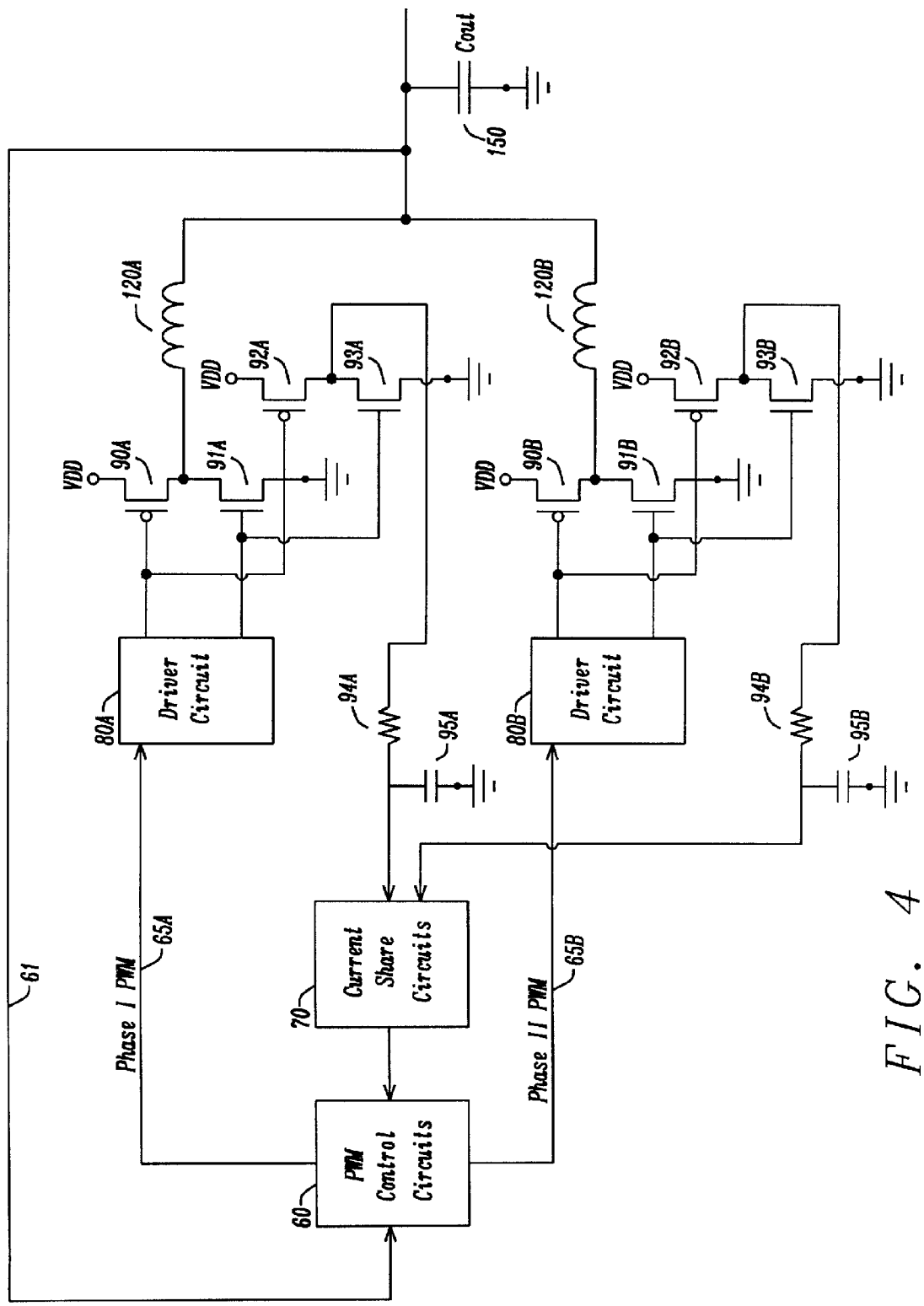
FIG. 4 is a circuit schematic of a second embodiment with a dummy output stage.

FIG. 4 is a circuit schematic of a second embodiment with a dummy output stage. FIG. 4 shows the circuit schematic of an embodiment for a two-phase buck converter. The device is a multi-phase switch regulator with improved efficiency, the device comprising a pulse width modulation (PWM) control circuit configured to generate PWM signal for each phase, a driver control network electrically coupled to said pulse width modulation (PWM) control circuit configured to receive a PWM signal (signal from said pulse width modulation (PWM) control circuit), an output stage electrically coupled to said driver configured to provide an output, a dummy output stage configured to receive driver signals from said driver control network, a low pass filter (LPF) electrically coupled to the output of a dummy driver output stage, a current share circuit configured to receive a low pass filter (LPF) signal from said low pass filter (LPF) and providing an low pass filter (LPF) output signal to said pulse width modulation (PWM) control circuit for current balancing. Note that this can be applicable to any number of phases, and other converter topologies such as boost, and buck-boost converters. In this example of a two-phase buck converter, the circuit comprises a pulse width modulation (PWM) controller circuit 60 which generates the Phase1 PWM signal 65A and Phase 2 PWM signal 65B. A feedback signal 61 from the output is an input to the PWM control circuits 60. The PWM control circuit 60 receives its signal from the current share circuit 70. The Phase 1 PWM signal 65A is coupled to the driver network 80A. The Phase 2 PWM signal 65B is coupled to the driver network 80B. The driver network 80A provides signals to the driver output stage, for p-channel MOSFET pull-up 90A, and n-channel MOSFET pull-down 91A, and dummy driver output stage p-channel MOSFET pull-up 92A and n-channel MOSFET pull-down 93A. The driver network 80B provides signals to the driver output stage, for p-channel MOSFET pull-up 90B, and n-channel MOSFET pull-down 91B, and dummy driver output stage p-channel MOSFET pull-up 92B and n-channel MOSFET pull-down 93B. The output of the dummy output stage formed with stage p-channel MOSFET pull-up 92A and n-channel MOSFET pull-down 93A is connected to a low pass filter. (LPF) of resistor element 94A and capacitor element 95A. The output of the dummy output stage formed with stage p-channel MOSFET pull-up 92B and n-channel MOSFET pull-down 93B is connected to a low pass filter (LPF) of resistor element 94B and capacitor element 95B. The output signal of the low pass filter (LPF) of resistor element 94A and capacitor element 95A is coupled to the current share circuit 70. The output signal of low pass filter (LPF) of resistor element 94B and capacitor element 95B is coupled to the current share circuit 70. At the driver stage output of the Phase 1 network is an inductor 120A. At the driver stage output of the Phase 2 network is an inductor 120B. Both inductors 120A and 120B are electrically connected to the output, and output capacitor Cout 150.

In this embodiment, any network that provides the function for a low pass filter can achieve equivalent results. The resistor element and the capacitor element can be implemented using passive or active elements, including metal oxide semiconductor (MOS) field effect transistors. The low pass filter network can include LC elements instead of RC elements. The filter network can also contain higher order filters.

Figure 5:
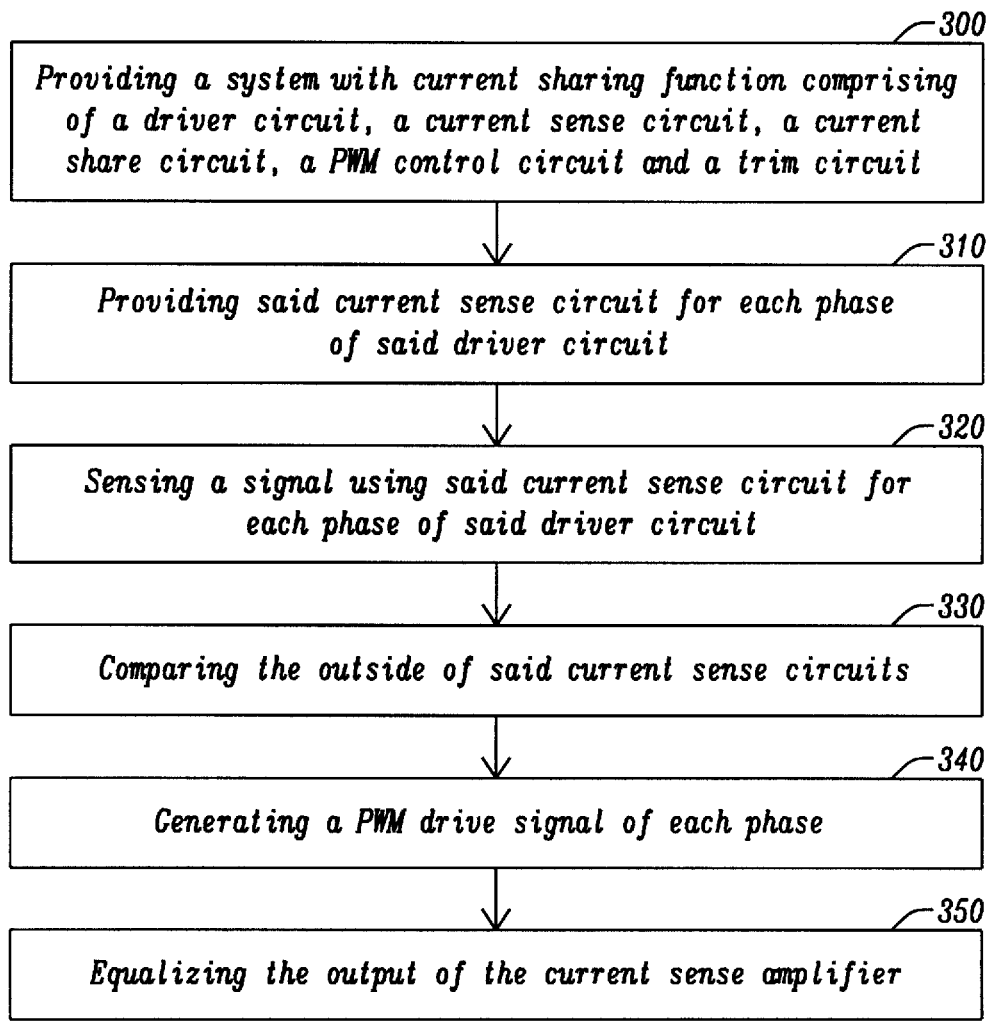
FIG. 5 is a method for a two phase switching regulator of a first embodiment; and, FIG. 6 is a method for a two phase switching regulator of a second embodiment.

FIG. 5 is a method for a two phase switching regulator of a first embodiment. The methodology includes the steps, the first step 300 (1) providing a system with current sharing function comprising a driver circuit, a current sense circuit, a current share circuit, a PWM control circuit, and a trim circuit; the second step 310 (2) providing said current sense circuit for each phase of said driver circuit; the third step 320 (3) sensing a signal using said current sense circuit for each phase of said driver circuit; fourth step 330 (4) comparing the output of said current sense circuits; the fifth step 340 (5) generating a PWM drive signal, and last step 350 (6) equalizing the output of the current sense amplifier.

Figure 6:
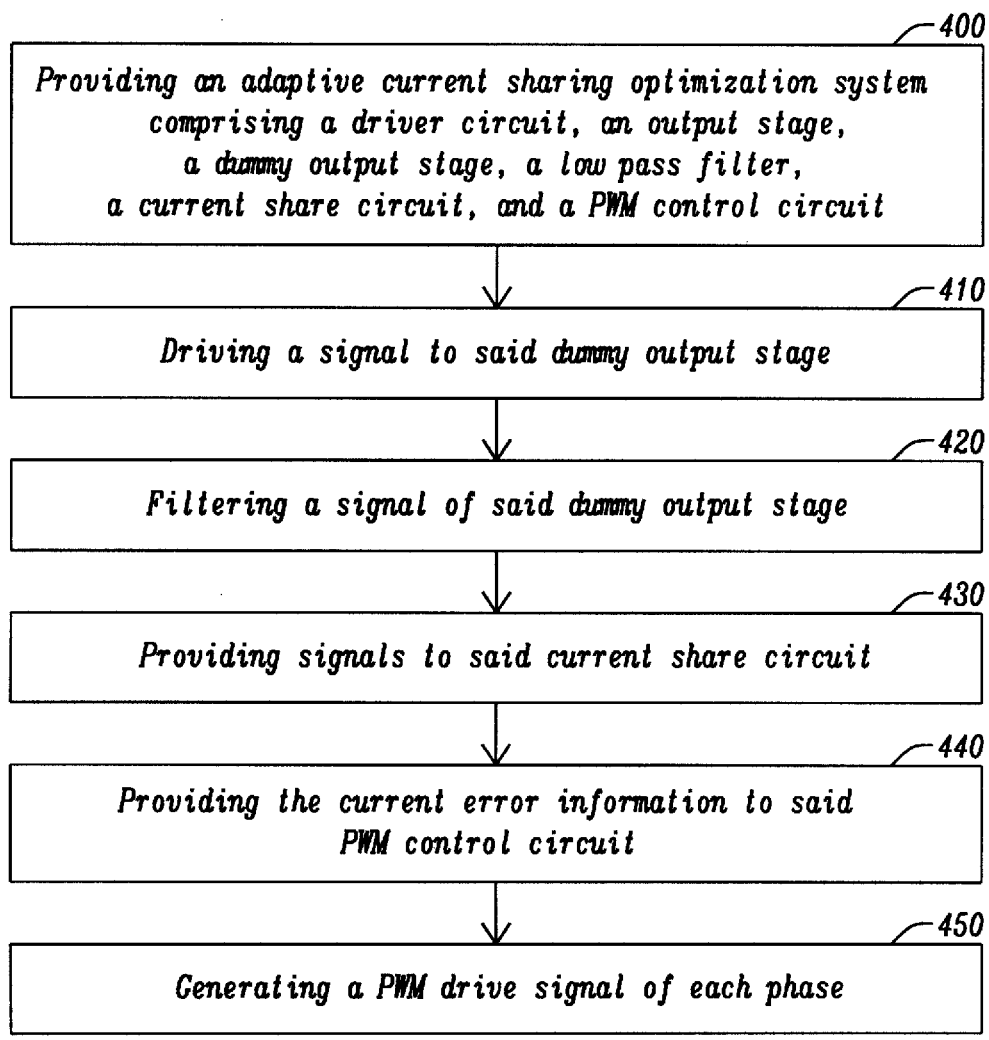

FIG. 6 is a method for a two phase switching regulator of a second embodiment. The methodology includes the steps, the first step 400 (1) providing an adaptive current sharing optimization system comprising a driver circuit, an output stage, a dummy output stage, a low pass filter, a current share circuit, and a PWM control circuit; the second step 410, (2) driving a signal to said dummy output stage; the third step 420 (3) filtering a signal of said dummy output stage; fourth step 430 (4) providing signals to said current share circuit; the fifth step 440 (5) providing the current error information to said PWM control circuit, and last step 450 (6) generating a PWM drive signal of each phase.

Each output stage has a dummy output stage and its output is averaged by filters. The filters can be low pass RC filters, of LC filters. The dummy output stage samples the current in the output driver. Since the role of the dummy output stage is to sample the current in the output driver network, the physical size of the sample network can be small. As a result, the addition of the dummy output stage, and the physical size of the p-channel MOSFET pull-up and the re-channel MOSFET pull-down can be small. Using a small dummy output stage, the area used to implement this additional elements can use minimum silicon area.

The averaged voltage of the dummy output stage can be calculated as $$V\text{ave}1 = D1 \times V\text{in} \quad \text{Phase 1:}$$

$$V\text{ave}2 = D2 \times V\text{in} \quad \text{Phase 2:}$$

Where Vave is the averaged voltage, D is the PWM duty cycle and Vin is the voltage.

The voltage drop due to the output current in the main stage output for each phase can be calculated as $$R1 \times I\text{out} = [(D1) \times R\text{ds-on } p + (1-D1) \times R\text{ds-on } n + R\text{ind}] \ast I1$$

$$R2 \times I\text{out} = [(D2) \times R\text{ds-on } p + (1-D2) \times R\text{ds-on } n + R\text{ind}] \ast I2$$

$$V\text{ave}1 = R1 \times I1 + V\text{out} \quad \text{Phase 1:}$$

$$V\text{ave}2 = R2 \times I2 + V\text{out} \quad \text{Phase 2:}$$

To control the current to make Vave1 and Vave2 equal, then the currents will be $$I1 = R2/(R1+R2) \times I\text{out}$$

$$I2 = R1/(R1+R2) \times I\text{out}$$

$$I\text{out} = I1 + I2$$

This results leads to the current magnitude that leads to the optimum efficiency.

The multi-phase switch regulator can be defined using bipolar transistors, or metal oxide semiconductor field effect transistors (MOSFETs). The switching regulator can be formed in a complementary metal oxide semiconductor (CMOS) technology and utilize p-channel and n-channel field effect transistors (e.g. PFETs and NFETs, respectively). The regulator can be formed in a bipolar technology utilizing homo-junction bipolar junction transistors (BJT), or hetero junction bipolar transistors (HBT) devices. The switch regulator can be formed in a power technology utilizing lateral diffused metal oxide semiconductor (LDMOS) devices. The LDMOS devices can be an n-type LDMOS (NDMOS), or p-type LDMOS (PDMOS). The switch regulator can be formed in a bipolar-CMOS (BiCMOS) technology, or a bipolar-CMOS-DMOS (BCD) technology.

As such, a multi-phase switch regulator with improved efficiency are herein described. The improvement is achieved with minimal impact on silicon area or power usage. The multi-phase switcher improves efficiency with the introduction of current sense networks, current share balancing, trim circuitry, and dummy output stage methods. Other advantages will be recognized by those of ordinary skill in the art. The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A multi-phase switching converter for minimizing direct current (d.c.) current, comprising:
   a plurality of phases, wherein each phase comprises a driver circuit, and an output stage configured to connect to an inductor;
   a plurality of current sense circuits for measuring current of each phase's output stage;
   a current share circuit connected to receive an output of each of said current sense circuits wherein said current sense circuits comprises a variable gain amplifier; and,
   a control circuit for driving each of said driver circuits, wherein said current of each of said output stages is set to differ among each of said phases, based on direct current (d.c.) resistance of said output stage and of said inductor.

2. The multi-phase switching converter of claim 1, wherein said variable gain amplifier is customized or personalized with a trim circuit.

3. The multi-phase switching converter of claim 2, wherein said DC resistance of each phase is estimated.

4. The multi-phase switch regulator of claim 1 wherein said control circuit uses pulse width modulation (PWM), and said current share circuit provides current sharing by adding offset for each a PWM phase signal to keep and control each current sense output at an equal magnitude.

5. A method of current sharing in a multi-phase switching converter comprising the steps of:
   providing a multi-phase switching converter for minimizing direct current (d.c.) current having a plurality of phases, wherein each phase comprises a driver circuit and an output stage configured to connect to an inductor, a plurality of current sense circuits for measuring current of each phase's output stage, a current share circuit connected to receive an output of each of said current sense circuits; and a control circuit for driving each of said driver circuits wherein said current of each of said output stages set to differ among each of said phases, based on direct current (d.c.) resistance of said output stage and of said inductor;
   providing said current sense circuit for each phase of said driver circuit;
   sensing a signal using said current sense circuit for each phase of said driver circuit;
   comparing the output of said current sense circuits; and,
   equalizing the output of the current sense amplifier.

6. The method of claim 5 wherein said direct current (d.c.) resistance of each phase is estimated.

7. The method of claim 5 wherein the currents among the phases is set to equalize the direct current (d.c.) loss in each phase.

8. The method of claim 5, wherein a dummy stage is used for each phase.

9. The method of claim 5, wherein the control circuit uses pulse width modulation (PWM).

10. The multi-phase switch regulator of claim 1, wherein a dummy stage is used for each phase.

* * * * *

UNITED STATES PATENT AND TRADEMARK OFFICE
CERTIFICATE OF CORRECTION

| | |
|---|---|
| PATENT NO. | : 9,520,788 B2 |
| APPLICATION NO. | : 14/468579 |
| DATED | : December 13, 2016 |
| INVENTOR(S) | : Hidenori Kobayashi |

It is certified that error appears in the above-identified patent and that said Letters Patent is hereby corrected as shown below:

In the Foreign Application Priority Data (30), add -- August 14, 2014 (EP) 14181098.6 --.

Signed and Sealed this
Twenty-third Day of May, 2017

Michelle K. Lee
*Director of the United States Patent and Trademark Office*